June 4, 1929.  L. R. LANNING  1,716,316
SEATING ARRANGEMENT FOR MOTOR VEHICLES
Filed Feb. 9, 1926  2 Sheets-Sheet 1
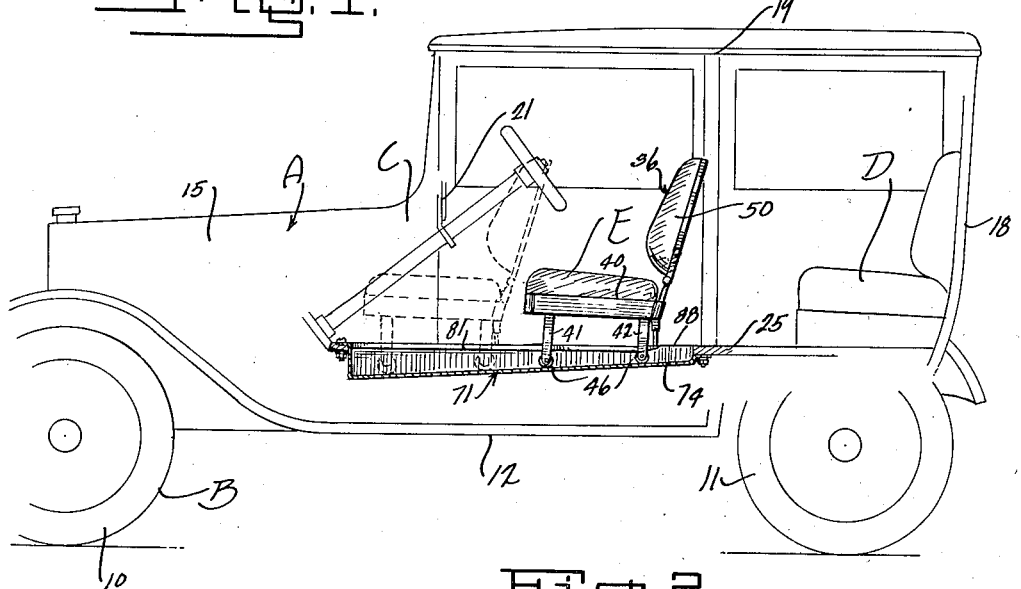
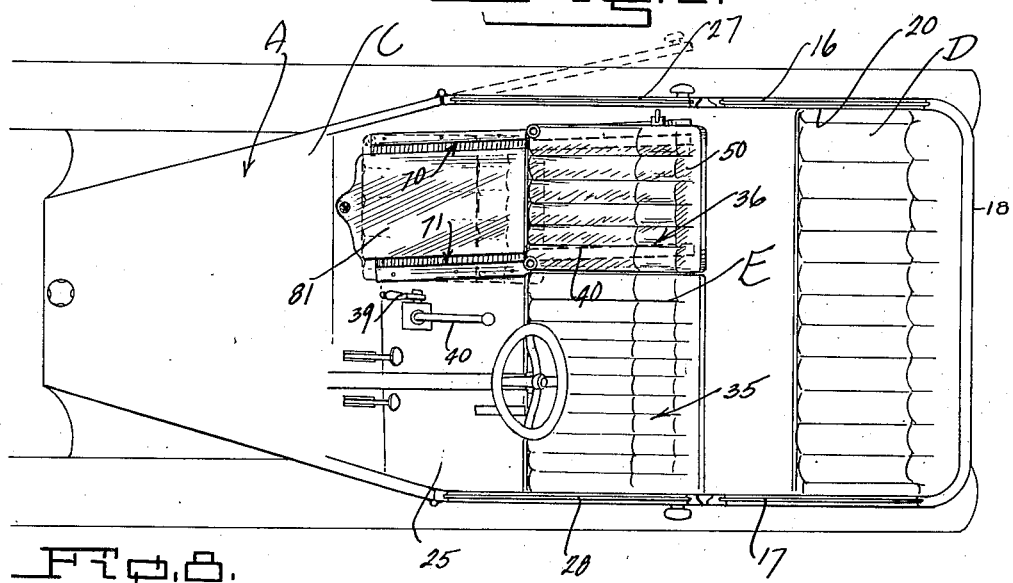
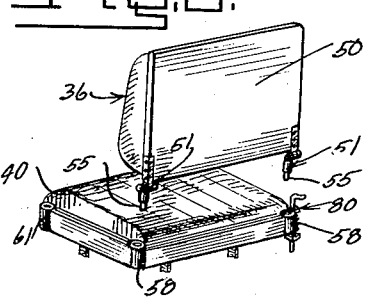
Inventor
Lawrence R. Lanning
By Lancaster Allwine
Attorneys June 4, 1929.  L. R. LANNING  1,716,316
SEATING ARRANGEMENT FOR MOTOR VEHICLES
Filed Feb. 9, 1926  2 Sheets-Sheet 2
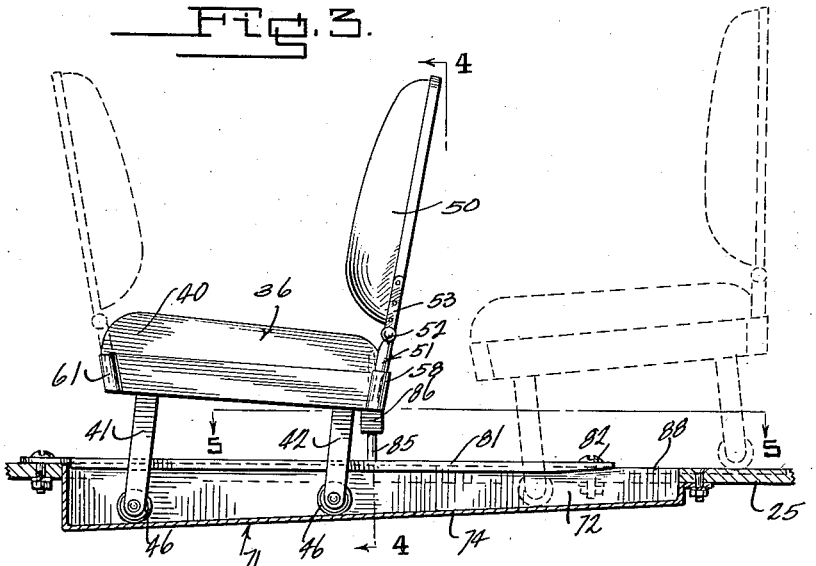
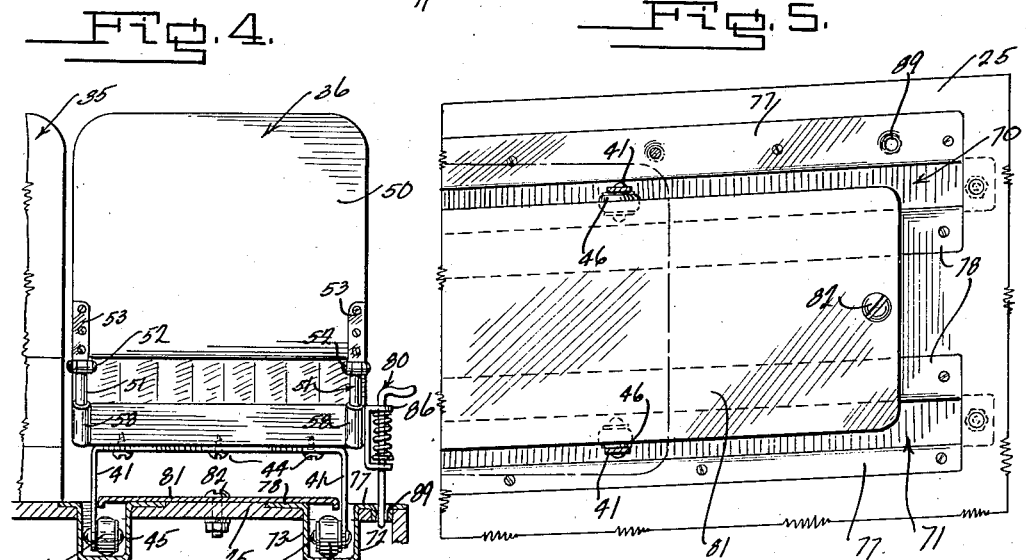
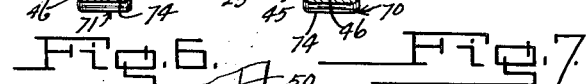
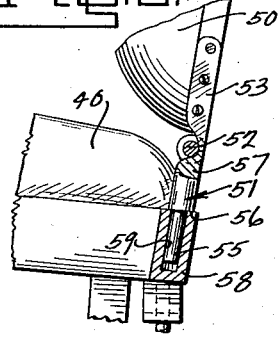
Inventor
Lawrence R. Lanning
By Lancaster and Allwine
Attorneys Patented June 4, 1929.

1,716,316

UNITED STATES PATENT OFFICE.

LAWRENCE R. LANNING, OF SABETHA, KANSAS.

SEATING ARRANGEMENT FOR MOTOR VEHICLES.

Application filed February 9, 1926. Serial No. 87,072.

This invention relates to improvements in seating arrangements for vehicles.

The primary object of this invention is the provision of an improved seating arrangement adapted for use in connection with motor vehicles, particularly of the coach type in which only one side door is provided at either side thereof, and by which seating arrangement access may be more conveniently had to the rear of the vehicle compartment either for commodity loading, or for the passage of individuals to and from the vehicle, without inconveniencing the passengers of the front seat.

A further object of this invention is the provision of a novel seating arrangement for motor vehicles of the coach type, including a right hand seat adjacent the driver which is collapsible forwardly by means of sliding, so that access may be more conveniently had to the vehicle compartment.

A further object of this invention is the provision of a novel type of adjustable and collapsible seating arrangement generally adaptable for use in connection with vehicles.

Other objects and advantages of this invention will be apparent during the course of the following detailed description.

In the accompanying drawings, forming a part of this specification, and wherein similar reference characters designate corresponding parts throughout the several views, Figure 1 is a diagrammatic representation of the side of a motor vehicle of the closed type, showing the improved front seating arrangement therefor, and the track means which slidably supports the same for collapsing.

Figure 2 is a plan view of the vehicle, partly in section, showing the improved seating arrangement with respect to the side closures or doors of the vehicle.

Figure 3 is a cross sectional view of the improved right hand front seat of the seating arrangement for vehicles, showing the novel adjustable and collapsible relation of the parts thereof.

Figures 4 and 5 are cross sectional views taken substantially on their respective lines in Figure 3 of the drawings.

Figure 6 is a fragmentary view, partly in section, showing the manner of detachably supporting the back of a seat.

Figure 7 is a seat retaining detent handle embodied as a part of the improved seating arrangement.

Figure 8 is a perspective view of the seat and back of the improved seating arrangement, showing the same in detachable relation.

In the drawings, wherein for the purpose of illustration is shown only a preferred embodiment of this invention, the letter A may generally designate the motor vehicle, which may comprise a chassis B; body C; rear seating arrangement D; and improved front seating arrangement E supported in novel relation upon the floor of the body C.

The chassis B is of the usual motor vehicle type, including front running gear 10; rear running gear 11; and a suitable frame 12 supporting the same.

The body C may be considered as comprising the engine covering or hood 15; right and left side walls 16 and 17 respectively; a rear wall 18; and roof construction 19. This body construction provides a commodity receiving or passenger riding compartment 20, and at the front of the same is provided the conventional instrument board or dash 21, beneath which, and forwardly beneath which extends a compartment adapted to receive the legs and feet of the passengers or driver upon the front seat, as in conventional construction. The body C may include a floor 25, which is conventional in all respects, except insofar as it is modified to slidably or movably receive the front seating construction E, as will be subsequently described.

The body C as shown, is of the coach type, and there is provided right and left doors 27 and 28 respectively in the side walls 16 and 17, as a means of access to the compartment 20; said doors being relatively wide, and being disposed at the ends of the front seating construction E, in accordance with conventional coach body construction.

The rear seating arrangement D is of the conventional construction, and may comprise a seat extending transversely across the compartment 20 at the rear wall 18, or may comprise any other type of seating or commodity receiving arrangement desired.

The essential novelty of the invention resides in the construction and support of the front seating arrangement E, and it is to be distinctly understood that this seating arrangement E may be used in connection with other types of body and vehicle constructions than that shown, since the same comprises novel features adaptable for a variety of uses other than in connection with the coach body type of vehicle.

Referring to the seating arrangement E, the same preferably comprises a stationary driver's seat 35; and a movable right hand seat 36 complementary to the seat 35. The seats 35 and 36 extend the entire width of the compartment 20, and together form a seat construction having as much seating space as the rear seat D, capable of supporting three persons. The stationary seat 35 is considerably wider than the seat 36, because of the fact that the seat 36 is collapsible and slidable forwardly of the compartment 20, and to this end the same must be limited in width, in order to avoid the brake lever 39 and gear shift lever 40, and analagous operating devices in the driver's compartment, ordinarily placed in the medial line of the driver's compartment. The seats 35 and 36 are thus truly complementary and together form a seat such as the conventional touring car seat or sedan seat, with but very little space between the same, so as to render the seating arrangement capable of seating three persons, as above mentioned.

The right hand or collapsible seating arrangement 36 preferably comprises a seat member 40 upholstered or suitably padded, and having front downwardly extending supporting legs 41 and rear shorter and downwardly extending supporting legs 42 which are preferably rigid with the seat member 40, in the relation illustrated in Figures 1 and 3 of the drawings. The front and rear seat legs 41 and 42 may each be constructed of a strip of U-shaped band iron or analogous material, suitably attached as at 44 to the bottom of the seat 40, with the legs 41 and 42, as the case may be, extending downwardly, and at their lower ends being suitably apertured for supporting inwardly extending spindles 45 upon which rollers 46 are rotatably supported, in the relation illustrated in the drawings.

The seating arrangement 36 also includes a detachable and adjustable back 50, comprising a suitable upholstered frame having the downwardly extending corner projections 51, hingedly connected at 52 to suitable stationary metal brackets 53 connected on the frame of the back 50, in the relation illustrated in Figure 6 of the drawings. The socket receiving projections 51 are thus hingedly connected for forward swinging with respect to the plane of the back 50, and at their lower ends they are provided with reduced extensions 55, which form shoulders 56 at the juncture of the same with the upper portions 57 of the projections 51, in the relation illustrated in Figure 6 of the drawings.

At the rear corners of the seat member 40 the frame thereof is provided with suitable sockets 58, having socket openings 59 opening upwardly therethrough, for detachably receiving the reduced extensions 55, with the shoulders 56 abutting against the tops of the sockets 58, to hold the seat back in place.

It is readily obvious that when the back 50 is in supported relation at the rear of the seat 40, the same may be swung forwardly incident to the pivot pins or connections 52, and collapse substantially parallel on the seat 40.

At the front corners of the seat 40 suitable sockets 61 are provided, opening inwardly in the same manner as the sockets 58, for detachably receiving the reduced extensions 55 of the seat projections 51, in order that the back 50 may be placed at the front of the seat 40, so that the person in the seating arrangement 36 may face to the rear during the driving of the vehicle, if desired.

The floor construction 25 of the vehicle is somewhat modified to accommodate the sliding seat 36. As illustrated in the drawings, right and left trackways 70 and 71 respectively are supported in parallel relation by the floor 25, parallel with the longitudinal axis of the vehicle, in the right hand side of the driver's compartment, and which respectively slidably receive the right and left leg rollers of the seat arrangement 36, as illustrated in the drawings. These tracks 70 and 71 may be formed of sheet metal, each of the same being U-shaped in formation, as illustrated in Figure 4 of the drawings, to provide side wall portions 72 and 73, connected at their lower ends by means of the actual track wall 74. The walls 72 and 73 at their upper ends are laterally flanged at 77 and 78 respectively, and countersunk inwardly of the top surface of the floor 25. Of course, the floor 25 is suitably grooved to receive the tracks 70 and 71, so that the actual track walls 74 are located below the plane of the floor 25, so that no part of the trackway projects above the top surface of the floor 25, and thus eliminates obstructions. The trackways provide slots which are open along the floor, and the track walls 74 of the tracks 70 and 71 incline downwardly from their rear ends towards the front of the vehicle, as illustrated in Figure 1 of the drawings, and this is primarily the reason for making the front legs 41 of the seat arrangement 36 longer than the rear legs 42, in order that the seat 36 may have a natural tendency to slide forwardly upon the release of its detent mechanism 80 which will be subsequently described.

A seat retainer plate 81 is detachably mounted at 82 upon the floor 25, between the trackways 70 and 71, the same having the side marginal portions thereof projecting slightly across the open tops of the slots of the trackways 70 and 71, as illustrated in Figure 4 of the drawings; these projecting side marginal portions of the retainer plate 81 extending above the rollers 46, to retain the same in the slots of the trackways 70 and 71, and prevent the normal lifting of the seat 36 off the trackways provided therefor. However, the plate 81 does not extend to the rear ends of the slots of the trackways 70 and 71, so that the rear end of each slot has an opening 88 at the rear ends of the trackway thru which the rollers 46 of the legs of the seat arrangement 36 may be lifted upon rearward sliding of the seat 36 to effect a detachment of the seat 36 from the trackways, as is shown in dotted lines in Figure 3 of the drawings.

Referring to the detent mechanism 80, the same is carried by the seat arrangement 36, for the purpose of retaining the same in a desired forward or rearward relation with respect to the stationary seat portion 35. It comprises the detent rod 85, slidably supported in vertical relation by a suitable bracket 86 which is carried by the frame of the seat 40. The upper end of the rod 85 is provided with a right angled handle extension 87, and at the lower end the rod is adapted to extend into a suitable opening 89 provided inwardly of the floor 25, preferably thru one of the laterally extending flanges of the tracks. Any number of the openings 89 may be desired, but a rear opening 89 is especially desirable in order to hold the seat 36 in its normal rearwardly positioned relation upon the tracks 70 and 71, as illustrated in Figure 1 of the drawings.

In operation, the seat 35 is used in the position illustrated in Figure 1 of the drawings. In this position the detent 80 holds the same in its rear position. If now it is desired to have access to the rear end of the compartment 20, or permit passengers to pass into the rear of the compartment 20, thru the opening controlled by the door 27, it is merely necessary for the passenger seated on the seat 36 to swing sideways into the driver's compartment, and by releasing the pawl 80, the seat will naturally, by gravity, ride downwardly along the tracks 70 and 71, in order to clear the doorway and permit passengers to pass into the rear or from the rear of the vehicle, as is readily obvious, and without necessity of the passenger in the seat 36 getting up therefrom. The trackways 70 and 71 may be such that the front end of the seat 40 slides into position beneath the instrument board 21, during the collapsing operation, to have a maximum clearance for the doorway controlled by the door 27. After the rear of the vehicle has been loaded it is merely necessary for the occupant of the seat 36 to push the seat rearwardly, as by placing his or her hands against the instrument board 21, and the same will be readily slid rearwardly, upon the trackways 70 and 71, incident to the anti-friction support thereof, until the detent 80 may be placed in the opening 89 to hold the seat in rearward position.

The mounting of the back 30 bears a definite relation with respect to the seats 35 and 36, since the seat 36 may be forwardly slid to the position illustrated in the full lines in Figure 3 of the drawings, and the back 50 thereof detached and placed in the position illustrated by the dotted lines on the seat 40, and in this position the passenger may seat upon the seat arrangement 36, facing rearwardly, yet also facing the driver of the vehicle seated upon the seat 35. This presents an important arrangement for practical seating purposes, since sometimes the occupant of the right seat 36 may desire to face the driver of the vehicle, in a comfortable attitude, for conversation, in such manner as to not detract the driver's attention from operation of the vehicle. Also, the novel placing of the back 50 upon the rear of the seat 40 is important, since thereby when the seat 40 is in its most rearward position, the occupant of the seat 40 may face towards the occupants of the rear seat D.

From the foregoing description of this invention it is apparent that a novel seating arrangement for automobiles has been provided, which is especially practical in nature, and which may be readily moved forwardly out of the way of the doorway, to permit the loading of the vehicle.

Various changes in the shape, size, and arrangement of parts may be made to the form of invention herein shown and described, without departing from the spirit of this invention or the scope of the claim.

I claim:

In a vehicle seating arrangement the combination of a supporting floor, channels carried upon the floor in a parallel relation therewith having bottoms inclined downwardly and forwardly with respect to the floor, a seat, legs carried by the seat having rollers thereon operating in said channels, and a single detachable retaining plate secured on the floor between said channels including marginal edges overhanging each of said channels for a portion of the length thereof to retain the rollers of the legs in said channels.

LAWRENCE R. LANNING.